United States Patent Office 3,373,142
Patented Mar. 12, 1968

3,373,142
PREPARATION OF FORMALDEHYDE-DICHLORO-ACETALDEHYDE COPOLYMERS WITH ALKYL-AMINE CATALYST
Kornel D. Kiss, University Heights, and Irving Rosen, Painesville, Ohio, assignors to Diamond Shamrock Corporation, a corporation of Delaware
No Drawing. Filed Oct. 5, 1964, Ser. No. 401,723
3 Claims. (Cl. 260—67)

ABSTRACT OF THE DISCLOSURE

The present invention relates to the preparation of thermoplastic copolymers possessing flame-resistant properties, by reacting a major amount of formaldehyde and a minor amount of dichloroacetaldehyde under substantially anhydrous conditions and in the presence of between 0.001 to about 25 millimols per mol of formaldehyde, of either triethylamine, dipropylamine or tributylamine as the polymerization catalyst.

---

This invention relates to novel thermoplastic compositions of matter. More particularly, it relates to halogen-containing copolymers structurally related to polyoxymethylene and to the process for preparing these compositions.

Polyoxymethylenes which are at present well known in the art may be prepared by polymerizing either formaldehyde, trioxane or other oligomers of formaldehyde in the presence of suitable polymerization initiators, preferably under substantially anhydrous conditions. These polymers are composed of recurring oxymethylene, —CH$_2$O—, units joined together in linear chains which may be terminated at one or at both ends by thermally-unstable hydroxyl groups, depending upon the method of preparation. Oxymethylene homopolymers thus will be degraded or decomposed in varying degrees when exposed to elevated temperatures encountered in processing. To minimize degradation, therefore, these polymer materials are usually stabilized prior to processing by chemical treatment and/or by incorporating stabilizing additives therewith.

We have now found that easily processable polymeric compositions which are structurally related to polyoxymethylene and possess similar toughness and strength properties may be prepared by copolymerizing either formaldehyde or trioxane with dichloroacetaldehyde.

More specifically, the present invention involves the preparation of useful, easily workable oxymethylene copolymer compositions by polymerizing, under substantially anhydrous conditions and in the presence of a suitable polymerization catalyst or initiator, a mixture containing from 75 to 99.99 mol percent of formaldehyde or formaldehyde equivalent in combination with from 0.1 up to 25 mol percent of dichloroacetaldehyde, the said process being conducted at a temperature within the range of −80° C. to +100° C.

The copolymer products obtained are solid, medium to high molecular weight materials which may be fabricated by conventional processing techniques to finished plastic articles. These copolymers exhibit essentially the same properties as polyoxymethylene but have an increased toughness by reason of their greater flexibility. In addition to their substantial degree of thermal stability in processing, these copolymers likewise exhibit significant flame resistance because of the chlorine incorporated.

While we do not wish to be bound by any definite theory with regard to the manner in which copolymerization is effected, it is believed that the dichloroacetaldehyde monomer is incorporated into the growing copolymer chain through its carbonyl

group so that the resulting copolymer product contains, interspersed between recurring oxymethylene units, recurring units derived from the dichloroacetaldehyde which have the structure

In the copolymer chain the dichloroacetaldehyde units as structurally represented above may be interspersed singly between recurring oxymethylene units and may likewise be present therein as comonomer blocks, i.e., segments of the chain comprising at least two of the said dichloroacetaldehyde units sequentially joined together with no oxymethylene unit between them.

The copolymer products of this invention may contain from about 0.1 up to 20 percent of recurring units derived from dichloroacetaldehyde, which percentage is determined chemically by elemental chlorine analysis of the copolymer. The preferred copolymers of this invention contain from 0.5 up to about 10 percent of dichloroacetaldehyde recurring units and from 90 up to 99.5 percent of oxymethylene recurring units.

In order to produce thermoplastic articles having useful property levels, the copolymers of this invention usually will have an inherent viscosity of at least 1, which value is determined by measuring at 60° C. the viscosity of a 0.5 percent solution of the copolymer in p-chlorophenol which contains 2 percent of α-pinene, by weight. An inherent viscosity of 1 corresponds to an average polymer molecular weight of approximately 18,000. Copolymers from which products having the most useful property levels are prepared usually have an inherent viscosity of at least 1.2, which value corresponds to an average polymer molecular weight of about 25,000.

Depending upon the percentage of dichloroacetaldehyde present in the copolymer products of this invention, these materials have melting points which are somewhat lower than or are similar to the melting point of oxymethylene homopolymers, i.e., these copolymers typically have melting points within the range of about 145° to 180° C. whereas oxymethylene homopolymers have a melting point of 185° to 186° C. Of particular advantage is the fact that these copolymers have, in many instances, softening points significantly lower than their melting points and thus may be processed over a wider and less critical temperature range than is possible when processing oxymethylene homopolymers. In appearance, the copolymers resemble polyoxymethylene and those having melting points close to polyoxymethylene likewise exhibit substantially similar properties.

The copolymerization reaction is effected in the presence of an ionic-type polymerization catalyst. Suitable catalysts of this type include Lewis acids, e.g., metal halides such as the halides of aluminum, titanium, zirconium, strontium, niobium and the like; organometallic compounds such as butyl lithium, diethyl zinc, triethyl aluminum, tributyl boron, phenyl magnesium bromide, methyl aluminum dichloride and the like; the coordinate complexes of metal halides, e.g., boron trifluoride, with organic compounds in which oxygen, nitrogen or sulfur is the donor atom; and organic nitrogen compounds such as triethylamine, dipropylamine, tributylamine, and the like. The metal halide catalysts or their coordinate complexes are preferably employed when preparing copolymers from trioxane. In practice, these catalysts are employed alone in the liquid or solid state or as solutions or suspensions in suitable organic solvents or liquids. The particular catalyst employed in the process of this invention generally may be used in an amount ranging from 0.001 to about 25 millimols for each mol of formaldehyde or formaldehyde equivalent used. However, an amount within the range of about 0.1 to 10 millimols per mol of formaldehyde generally has been found satisfactory and is preferred.

The copolymer products of this invention, especially those from trioxane, may be conveniently prepared in good yields by contacting the monomers with a catalyst in the absence of a solvent or other liquid reaction medium. Alternatively, the copolymerization may be conducted in an anhydrous organic liquid which is a solvent for the monomers and for the catalyst and which is a liquid at the reaction temperature. Suitable solvents include aliphatic and cycloaliphatic hydrocarbons, especially such hydrocarbons which contain from 3 to 12 carbon atoms per molecule, e.g., n-heptane and cyclohexane; aromatic hydrocarbons, such as toluene; and halogenated aliphatic hydrocarbons, e.g., methylene chloride. When a liquid reaction medium is employed in the process, typically a ratio of from 0.5 to 25 parts of liquid for each part of formaldehyde or formaldehyde equivalent is used.

As stated previously, the reaction whether conducted in bulk or in a solvent medium as described above generally may be carried out at temperatures between the range of $-80°$ to $+100°$ C. for a time period of from 1 hour to 20 hours. However, the reaction is preferably carried out at a temperature within the range of $-72°$ to $+50°$ C. for a time period of from 2 to 16 hours.

As it is essential that the copolymerization process be conducted under anhydrous or substantially anhydrous conditions, a catalyst solution employed is prepared and then kept prior to use in a nitrogen atmosphere; the liquid reaction medium employed is dried prior to use and the process is carried out entirely under nitrogen.

Upon completion of the reaction, the copolymerization mixture is filtered to recover the product precipitate. Before being dried, the product may be purified by leaching it well with methanol, acetone, etc., to remove any catalyst residues or unreacted monomers remaining. It may also be treated with solvents such as tetrahydrofuran to remove any low molecular weight copolymers or homopolymers which may be present.

The copolymer products of this invention may be used to prepare articles such as moldings, films, sheets, rods, tubes, fibers, filaments and the like by conventional molding, extrusion and/or casting processes such as are practiced at the present time. As stated earlier, the copolymers may be processed within a lower and less critical temperature range than is possible when processing oxymethylene homopolymers, since these products begin to soften at a temperature somewhat below their melting points. Likewise, at processing temperatures, the copolymers generally exhibit good thermal stability and oftentimes may be processed as prepared without any further stabilizing treatment, i.e., by converting unstable hydroxyl groups terminating the polymer chains to more stable esters or ether groups and/or by incorporating stabilizing additives therewith. However, it is to be understood that the copolymers may be so stabilized, if desired, without departing from the intended scope of this invention. Additionally, in processing, the copolymers may be used unmodified or, if desired, may have incorporated therewith additives such as antioxidants, fillers, pigments, stabilizers, processing aids and the like which are oftentimes employed when processing thermoplastic materials.

In order that those skilled in the art may more completely understand the present invention and the preferred methods by which the same may be carried into effect the following specific examples are offered.

*Example 1*

A one-liter, four-necked polymerization flask is fitted with an agitator, a thermometer well, a reflux condenser, a rubber serum cap for catalyst injection and with inlet and outlet tubes for the passage of nitrogen and formaldehyde vapors. An electrically-heated, one-liter, three-necked flask used as a pyrolyzer to supply formaldehyde monomer to the polymerizer is fitted with a thermometer well and gas inlet and outlet tubes and is connected to the polymerization flask by means of a U-tube one inch in diameter and about ten inches long, positioned in a Dewar flask. The equipment is cleaned, dried at an elevated temperature and assembled while hot. At room temperature, one-hundred g. of trioxymethylene (reagent grade) is charged to the pyrolyzer. Five-hundred ml. (242 g.) of anhydrous n-heptane is charged to the polymerization flask and agitation is started. Nitrogen is passed through the system and is continued at a low rate of flow throughout the reaction to provide an oxygen-free atmosphere. Two ml. of dichloroacetaldehyde is introduced into the polymerizer and dissolved in the n-heptane, after which 0.16 ml. of triethylamine catalyst is injected into the polymerization mixture. The formaldehyde vapors generated by pyrolyzing the trioxymethylene are passed through the U-trap (maintained at a temperature below 0° C.) at a uniform continuous rate into the polymerizer above the surface of the agitated solution. After the introduction of the formaldehyde vapors, the temperature of the reaction mixture is raised from 26° to 38° C. The reaction mixture is then maintained at this temperature for 3 hours, after which the formaldehyde generator is shut down and the reaction mixture is cooled to room temperature. The mixture is discharged from the polymerizer and filtered to isolate the product precipitate. The separated product is washed well with n-heptane and dried at 45° C., under vacuum. Twenty-seven g. of a white polymeric product is obtained which is shown by chemical analysis to contain 2.6 percent chlorine corresponding to a dichloroacetaldehyde content in the copolymer of about 1.03 mole percent. This copolymer has an inherent viscosity of 2.57. As observed on a Fisher-Johns melting point apparatus, the copolymer begins to soften at 155° C., melts at 165° C. and shows good stability up to at least 180° C. A portion of the copolymer is molded in a plunger-type molding press for 1 minute, at 175° C. and under a pressure of 4000 p.s.i. A tough, white molded specimen is obtained which is more flexible than a disc prepared from a formaldehyde homopolymer prepared under similar polymerization conditions. This molding shows no evidence of any thermal degradation.

*Example 2*

Following the general procedure as outlined in Example 1, a formaldehyde-dichloroacetaldehyde copolymer is prepared employing 24.3 g. of trioxymethylene (reagent grade), 350 ml. of anhydrous toluene, 18.3 g. of dichloroacetaldehyde and, as catalyst, 0.2 g. of butyl lithium in solution in n-heptane (3.86 millimols catalyst per mol of formaldehyde). In this example, after adding the monomers to the polymerizer at $-72°$ C., the temperature of the polymerizer is raised to room temperature (22° C.) and the catalyst is injected. After catalyst addition, the reaction is continued without agitation at room temperature for 16 hours. The polymerization mixture is then discharged and filtered to isolate the product precipitate. The separated product is washed well with methanol and is dried at 40° C. under vacuum. There is recovered 23.33 g. of a fine, white polymeric product which contains 2.7 mol percent of dichloroacetaldehyde units, as determined by elemental chlorine analysis. This copolymer begins to soften at 155° C. and melts at 166° C. It is molded as described in Example 1 to produce white specimen moldings which are similar in stability, toughness and strength properties to the molded products of Example 1.

*Example 3*

A 250-milliliter, three-necked flask fitted with an agitator, a thermometer, a rubber serum cap for injecting the reaction ingredients and with nitrogen inlet and outlet tubes is purged with nitrogen. In another container, 18.0 g. (0.6 mol) of trioxane is dissolved in 59.5 g. (0.7 mol) of methylene chloride. The resulting solution is passed through molecular sieves and is injected into the polymerizer by means of a syringe, after which 8.1 ml. (11.3 g., 0.1 mol) of dichloroacetaldehyde is injected into the polymerizer. While nitrogen purging is continued, the reaction mixture is then cooled to 0° C. and 0.6 ml. of a 0.8 molar solution of boron trifluoride diethyl etherate in toluene (0.47 millimol catalyst per mol of formaldehyde equivalent) is injected into the polymerizer. Following the catalyst addition, the reaction mixture is maintained at 0° C. for a time period of 5 hours, after which it is quenched with approximately 50 ml. of methanol to neutralize and deactivate the catalyst. The treated reaction mixture is then filtered to isolate the dispersed product precipitate. The separated product is slurried in tetrahydrofuran and refiltered. It is then washed well with methanol and finally dried at 50° C. under vacuum. There is recovered 19.4 g. (66% conversion) of fine, white polymeric product which contains 15 mol percent of dichloroacetaldehyde, as determined by elemental chlorine analysis. This copolymer has a melting point of approximately 150° C. When molded at 160° C. as described in Example 1, the copolymer product of this example produces white, tough specimen moldings substantially similar in thermal stability and properties to the products of the previous examples.

*Example 4*

In this example, a trioxane-dichloroacetaldehyde copolymer is prepared in the absence of solvent, employing polymerization equipment similar to that of Example 3. At room temperature, 45 g. (0.5 mol) of trioxane and 20 ml. (28.3 g., 0.25 mol) of dichloroacetaldehyde are charged to the reaction flask and are blended together with agitation while the flask is purged with nitrogen. The flask and its contents are then warmed to 35° C., after which 0.005 ml. (0.018 millimol per mol of formaldehyde equivalent) of boron trifluoride dibutyl etherate is injected into the flask. After the catalyst addition, the reaction is continued for 20 minutes while maintaining the reaction mixture at 35° C. An equimolar mixture of methanol and heptane is then added to the reaction mixture to deactivate the catalyst. The mixture is discharged from the flask and filtered to isolate the product precipitate. The separated product is slurried in methanol, refiltered and finally dried at 40° C. under vacuum. The polymeric product recovered (24 g.) is a fine, white pulverulent material which contains 5.6 mol percent dichloroacetaldehyde, as determined by elemental chlorine analysis. This copolymer is observed to soften at approximately 135° C. and to melt at 144° C. It can be molded at 150° C. under conditions as described in the previous examples to produce white specimen moldings which show no evidence of any thermal degradation. These moldings are somewhat more flexible than the moldings prepared in the previous examples.

While the invention has been described with particular reference to specific embodiments thereof, it is not to be so limited, since changes and modifications therein may be made which are within the full intended scope of the invention as defined by the appended claims.

What is claimed is:

1. A process for preparing a copolymer composition which comprises reacting, under substantially anhydrous conditions, at a temperature ranging from −80° C. to +100° C. and for a time period of from 1 hour to 20 hours, a major amount of formaldehyde and a minor amount of dichloroacetaldehyde in the presence of between 0.001 to about 25 millimols per mol of formaldehyde of a polymerization catalyst which is triethylamine, dipropylamine, or tributylamine; and recovering a solid copolymer containing from 90 up to 99.5 percent of recurring oxymethylene units and from about 0.5 up to 10 percent of recurring units derived from the dichloroacetaldehyde.

2. The process of claim 1 in which the reaction is conducted at a temperature ranging from −72° C. to +50° C. for a time period of from 2 to 16 hours.

3. The process of claim 1 which is conducted in an inert, substantially anhydrous organic liquid reaction medium.

References Cited

UNITED STATES PATENTS

| | | | |
|---|---|---|---|
| 3,183,213 | 5/1965 | Van Lohuizen et al. | 260—67 |
| 3,272,780 | 9/1966 | Wilson et al. | 260—73 |
| 3,278,490 | 10/1966 | Rosen et al. | 260—67 |

FOREIGN PATENTS

| | | |
|---|---|---|
| 902,602 | 8/1962 | Great Britain. |
| 911,819 | 11/1962 | Great Britain. |

OTHER REFERENCES

Novak et al.: Faraday Society Transactions, 55 (441), pp. 1484–1489 (September 1959) (p. 1484 relied on).

Novak et al.: Canadian Journal of Chemistry, 37, pp. 1722–1726 (October 1959), (p. 1733 relied on).

Kern et al.: Angewandte Chemie, 73(b), pp. 177–186 (March 1961), (pp. 177–183 relied on).

WILLIAM H. SHORT, *Primary Examiner.*

L. PHYNES, *Assistant Examiner.*